United States Patent
McGill et al.

(10) Patent No.: US 11,548,521 B2
(45) Date of Patent: Jan. 10, 2023

(54) SYSTEMS, METHODS AND VEHICLES FOR DETERMINING WRONG DIRECTION DRIVING

(71) Applicant: Toyota Research Institute, Inc., Los Altos, CA (US)

(72) Inventors: Stephen G. McGill, Broomall, PA (US); Guy Rosman, Newton, PA (US); Luke S. Fletcher, Cambridge, MA (US); Simon A. I. Stent, Cambridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 385 days.

(21) Appl. No.: 16/836,311

(22) Filed: Mar. 31, 2020

(65) Prior Publication Data

US 2021/0300397 A1 Sep. 30, 2021

(51) Int. Cl.
| | |
|---|---|
| *B60W 50/14* | (2020.01) |
| *B60W 30/12* | (2020.01) |
| *G06V 20/56* | (2022.01) |

(52) U.S. Cl.
CPC ............ *B60W 50/14* (2013.01); *B60W 30/12* (2013.01); *G06V 20/588* (2022.01)

(58) Field of Classification Search
CPC ...... B60W 50/14; B60W 30/12; G06V 20/588
USPC .......................................................... 701/28
See application file for complete search history.

(56) References Cited

U.S. PATENT DOCUMENTS

| | | | |
|---|---|---|---|
| 10,089,877 B2 | 10/2018 | Offenhaeuser et al. | |
| 11,288,957 B2* | 3/2022 | Adireddy | ................. G08G 1/04 |
| 2018/0218608 A1* | 8/2018 | Offenhaeuser | ......... G08G 1/162 |

FOREIGN PATENT DOCUMENTS

| | | | |
|---|---|---|---|
| DE | 102016203746 A1 | 9/2017 | |
| DE | 102016210032 A1 | 12/2017 | |
| DE | 102018003149 A1 | 10/2019 | |
| KR | 102027646 B1 | 11/2019 | |
| WO | 2016074771 A1 | 5/2016 | |
| WO | WO-2016074771 A * | 5/2016 | ............. G08G 1/056 |

OTHER PUBLICATIONS

SP1—safeprobe—in-vehicle sensing and platform (http://www.safespot-eu.org/documents/D1.2.1_Vehicle_probe_use_case-and_test_scenarios.pdf), Nov. 27, 2019.

\* cited by examiner

*Primary Examiner* — Peter D Nolan
*Assistant Examiner* — Luke Huynh
(74) *Attorney, Agent, or Firm* — Dinsmore & Shohl LLP (57) ABSTRACT

Systems, vehicles and methods for determining wrong direction driving are disclosed. In one embodiment, a system for determining a vehicle traveling in a wrong direction includes one or more sensors that produce sensor data, one or more processors, and one or more non-transitory computer-readable medium storing computer readable-instructions. When the computer-readable instructions are executed by the one or more processors, the computer-readable instructions cause the one or more processors to determine one or more lanes within a roadway using the sensor data, determine a direction of travel of the one or more lanes using the sensor data, and identify a non-compliant vehicle traveling in a direction in the one or more lanes that is different from the determined direction of travel in the one or more lanes.

11 Claims, 6 Drawing Sheets

SYSTEMS, METHODS AND VEHICLES FOR DETERMINING WRONG DIRECTION DRIVING

TECHNICAL FIELD

The present specification relates to vehicle warning systems, and more particularly, to systems, methods and vehicles for determining wrong direction driving and warning other vehicles of said wrong direction driving.

BACKGROUND

In some instances, a driver of a vehicle may drive in a wrong direction that is opposite or otherwise different from an intended direction of travel. The reasons for such wrong direction driving are numerous. As examples, a driver may enter an exit ramp of a highway, a driver driving in a foreign jurisdiction may be used to driving on an opposite side of the road, a driver may be intoxicated, and the like. Vehicles driving in the wrong direction may present significant issues for other vehicles traveling on the same roadway.

SUMMARY

In one aspect, a system for determining a vehicle traveling in a wrong direction includes one or more sensors that produce sensor data, one or more processors, and one or more non-transitory computer-readable medium storing computer readable-instructions. When the computer-readable instructions are executed by the one or more processors, the computer-readable instructions cause the one or more processors to determine one or more lanes within a roadway using the sensor data, determine a direction of travel of the one or more lanes using the sensor data, and identify a non-compliant vehicle traveling in a direction in the one or more lanes that is different from the determined direction of travel in the one or more lanes.

In another aspect, a method for determining a vehicle traveling in a wrong direction includes receiving sensor data from one or more sensors, determining, using the sensor data, one or more lanes within a roadway, and determining, using the sensor data, a direction of travel of the one or more lanes. The method further includes identifying, based on the sensor data and the determined direction of travel of the one or more lanes, a non-compliant vehicle traveling in a direction in the one or more lanes that is different from the determined direction of travel in the one or more lanes.

In yet another aspect, a vehicle includes one or sensors that produce sensor data, one or more processors, and one or more non-transitory computer-readable medium storing computer readable-instructions. When the computer-readable instructions are executed by the one or more processors, the computer-readable instructions cause the one or more processors to determine one or more lanes within a roadway using the sensor data, determine a direction of travel of the one or more lanes using the sensor data, and identify a non-compliant vehicle traveling in a direction in the one or more lanes that is different from the determined direction of travel in the one or more lanes.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein describe vehicles, systems and methods for wrong direction driving and transmitting warnings to other vehicles regarding wrong direction driving.

In some instances, a driver of a vehicle may drive in a wrong direction that is opposite or otherwise different from an intended direction of travel. The reasons for such wrong direction driving are numerous. As examples, a driver may enter an exit ramp of a highway, a driver driving in a foreign jurisdiction may be used to driving on an opposite side of the road, a driver may be intoxicated, and the like. Vehicles driving in the wrong direction may present significant issues for other vehicles traveling on the same roadway. For example other vehicles may need to make quick and sudden maneuvers to avoid the vehicle driving in the wrong direction.

Map data, such as high-definition maps, may include direction of travel for lanes of roadways. However, there are roadways where high-definition maps are not available, or the direction of travel information is otherwise not available. In such cases, vehicles traveling in a wrong direction are not automatically detectible. Presently, a driver witnessing the wrong direction travel must call a government authority, such as a police department or highway patrol to report the wrong direction travel. The delay in response by the government authority may cause the driver to continue driving in a wrong direction and affect others in the surrounding area.

Accordingly, alternative vehicles, systems, and methods for detecting wrong direction driving in real-time within the need for map data are desired. Various embodiments of vehicles, systems and methods for determining wrong direction driving are described in detail below.

Figure 1:
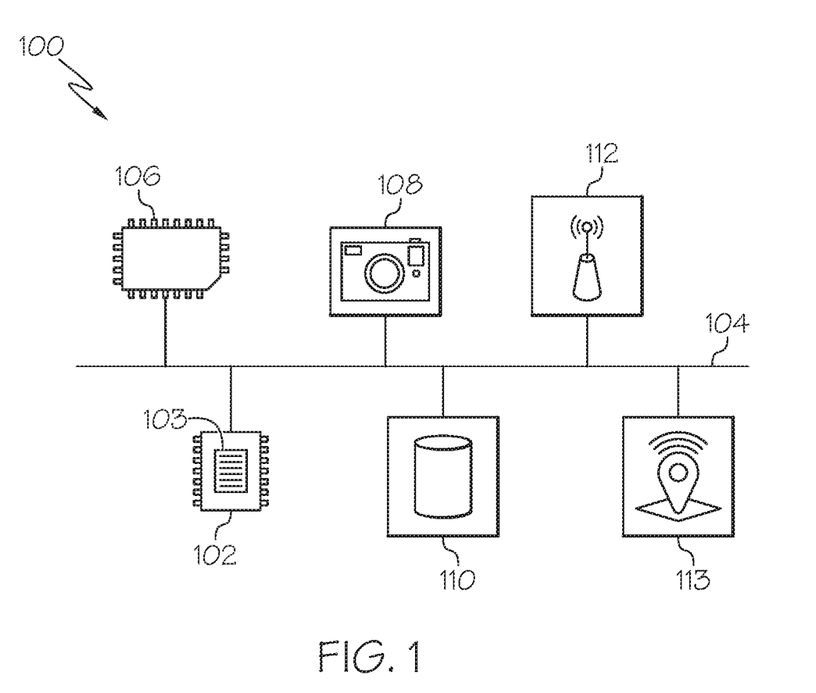
FIG. 1 schematically depicts an example system for determining wrong direction driving, according to one or more embodiments shown and described herein.

FIG. 1 schematically depicts a non-limiting, example system 100 for detecting wrong direction driving by vehicles on roadways. The system 100, which may be implemented in a vehicle 400 (see FIG. 4) includes one or more processors 106, a communication path 104, one or more memory modules 102 configured as non-transitory computer-readable medium, a wireless communication module 112 (e.g., network interface hardware for communication with external computing devices, vehicles, and the like), one or more sensors 108, and one or more additional memory modules 110, the details of which will be set forth in the following paragraphs. It should be understood that the system 100 of FIG. 2 is provided for illustrative purposes only, and that other systems comprising more, fewer, or different components may be utilized. As stated above, the system 100 may be implemented in a vehicle 400. However, some or all of the components illustrated by FIG. 1 may be provided in one or more computing devices that are remote from the vehicle 400. In further embodiments, the system 100 may be implemented in the infrastructure of a roadway, such as on traffic lights, road lights, or other structures.

Each of the one or more processors 106 may be any device capable of executing machine readable and executable instructions. Accordingly, each of the one or more processors 106 may be a controller, an integrated circuit, a microchip, a computer, or any other computing device. The one or more processors 106 are coupled to a communication path 104 that provides signal interconnectivity between various components of the system 100. Accordingly, the communication path 104 may communicatively couple any number of processors 106 with one another, and allow the components coupled to the communication path 104 to operate in a distributed computing environment. Specifically, each of the components may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth®, Near Field Communication (NFC) and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The system 100 includes one or more memory modules 102 coupled to the communication path 104. The one or more memory modules 102 may comprise RAM, ROM, flash memories, hard drives, or any device capable of storing machine readable and executable instructions 103 such that the machine readable and executable instructions can be accessed by the one or more processors 106. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 102. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 1, the system 100 may optionally include one or more additional memory modules 110 that store data relevant to performing the functionalities described herein. For example the one or more additional memory modules 110 may include map data, historical sensor data, historical travel direction data, and other information used to determine travel direction, including wrong direction travel. This additional information may be stored in the one or more memory modules 102 or in a dedicated memory modules 110 as shown in FIG. 1. In some embodiments, all or some of the information stored in the one or more additional memory modules may be stored remotely in a server device. Other variations for storing this additional information are also possible.

The example system 100 comprises a satellite antenna 113 coupled to the communication path 104 such that the communication path 104 communicatively couples the satellite antenna 113 to other modules of the system 100. The satellite antenna 113 is configured to receive signals from global positioning system satellites. Specifically, in one embodiment, the satellite antenna 113 includes one or more conductive elements that interact with electromagnetic signals transmitted by global positioning system satellites. The received signal is transformed into a data signal indicative of the location (e.g., latitude and longitude) of the satellite antenna 113 or an object positioned near the satellite antenna 113, by the one or more processors 106. Thus, the satellite antenna 113 allows the system 100 to monitor its location.

The system 100 comprises one or more sensors 108. Each of the one or more sensors 108 is coupled to the communication path 104 and communicatively coupled to the one or more processors 106. The one or more sensors 108 may include, but are not limited to, LiDAR sensors, RADAR sensors, optical sensors (e.g., cameras, laser sensors, proximity sensors, location sensors), and the like. The sensors 108 produce sensor data that may be used to perform a variety of functions, such as navigate an autonomous vehicle, provide data for estimating road and lane geometry, detecting intended direction of travel within lanes, and detecting wrong direction drivers or other road agents (e.g., cyclists, pedestrians, and the like), as described in detail below.

Still referring to FIG. 1, the system 100 comprises wireless communication module 112 (e.g., network interface hardware) for communicatively coupling the system 100 to the remote computing devices, such as other vehicles, a remote server, and the like. The wireless communication module 112 can be communicatively coupled to the communication path 104 and can be any device capable of transmitting and/or receiving data via a network. Accordingly, the wireless communication module 112 can include a communication transceiver for sending and/or receiving any wired or wireless communication. For example, the wireless communication module 112 may include an antenna, a modem, Wi-Fi card, WiMax card, mobile communications hardware, near-field communication hardware, satellite communication hardware and/or any wireless hardware for communicating with other networks and/or devices. In one embodiment, the wireless communication module 112 includes hardware configured to operate in accordance with the Bluetooth® wireless communication protocol. The wireless communication module 112 of the system 100 may transmit warning information about detected wrong direction driving to nearby vehicles, the vehicle driving in the wrong direction, government agencies, and any other relevant entities.

As described in more detail below, the computer-readable instructions 103 instruct the one or more processors 106 to detect road agents traveling in a wrong direction within a lane, and also issue warnings to nearby vehicles.

Figure 2A:
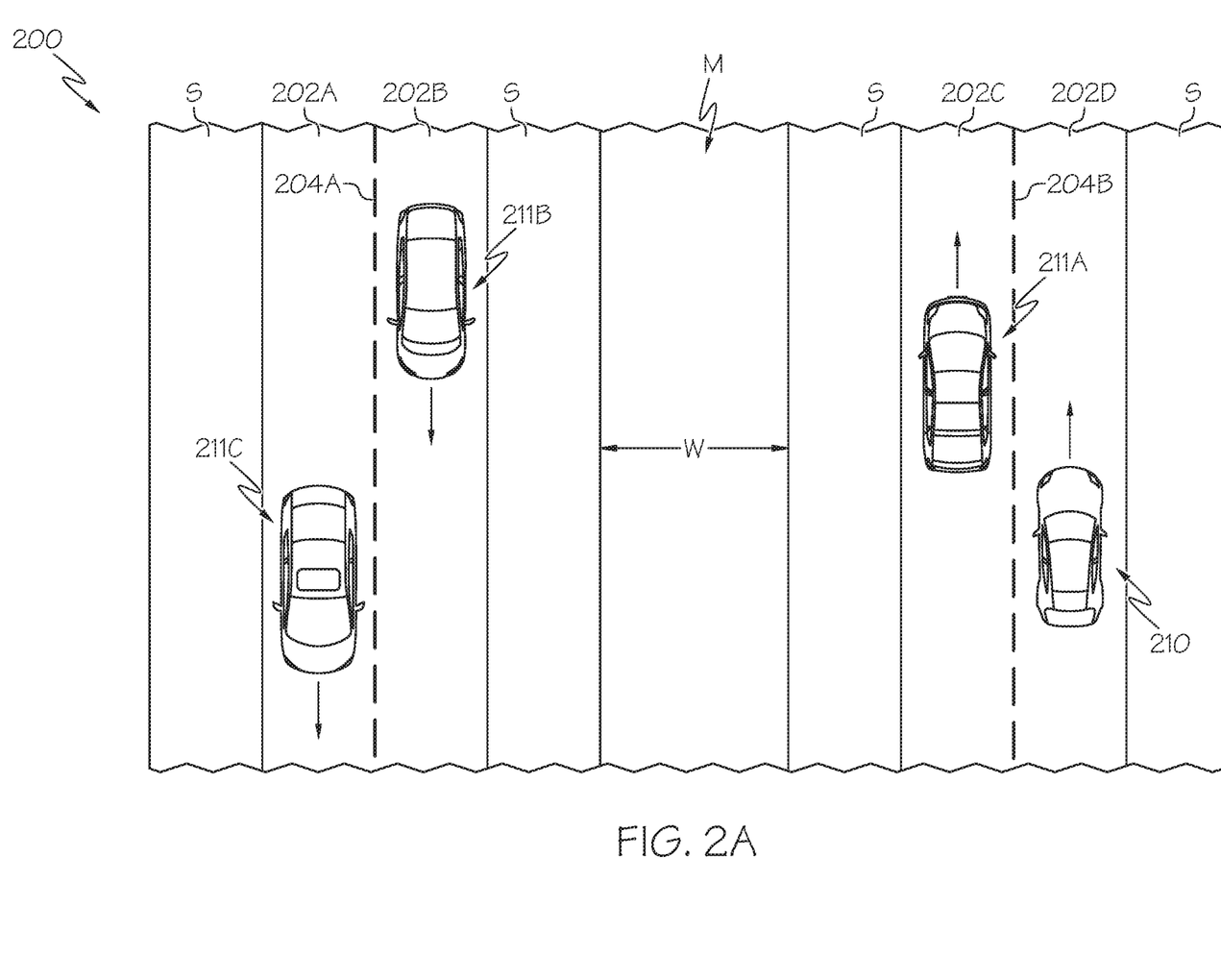
FIG. 2A schematically depicts an example divided highway where embodiments of the present disclosure may be utilized.

FIG. 2A illustrates a non-limiting example of a roadway 200 configured as a divided highway. The roadway includes four lanes: lane 202A and lane 202B separated by lane dividing line 204A have an intended travel direction in a first direction, and lane 202C and lane 202D separated by lane dividing line 204B having an intended travel direction in a second direction that is opposite from the first direction. The two sets of lanes are separated by a median M having a width W. Shoulders S are present and transition the respective lanes to non-roadway surfaces. Vehicle 211C is traveling in lane 202A in the first direction as indicated by the respective arrow, and vehicle 211B is traveling in lane 202B in the first direction as indicated by the respective arrow. Vehicle 211A is traveling in lane 202C in the second direction as indicated by the respective arrow, and vehicle 210 is traveling in lane 202D in the second direction as indicated by the respective arrow. Vehicle 210 is referred to herein as an "ego vehicle" having the system that detects wrong direction travel. In the example of FIG. 2A, all vehicles are traveling in the proper, intended directions.

Figure 2B:
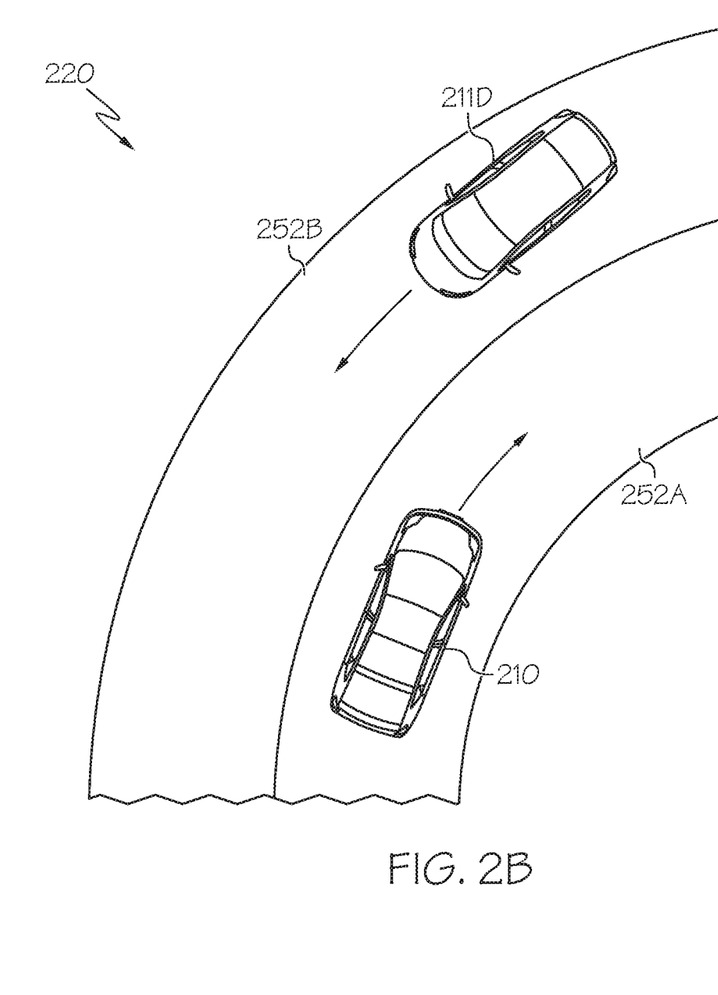
FIG. 2B schematically depicts an example curved roadway where embodiments of the present disclosure may be utilized.

FIG. 2B illustrates another non-limiting example of a roadway 220 that includes a curved portion. The roadway 220 includes lane 252A having an intended travel direction in a first direction and lane 252B having an intended travel direction in a second direction that is opposite from the first direction. Vehicle 211D is traveling in lane 252B in the first direction as indicated by the respective arrow. Ego vehicle 210 is traveling in lane 252A in the second direction as indicated by the respective arrow.

Figure 4:
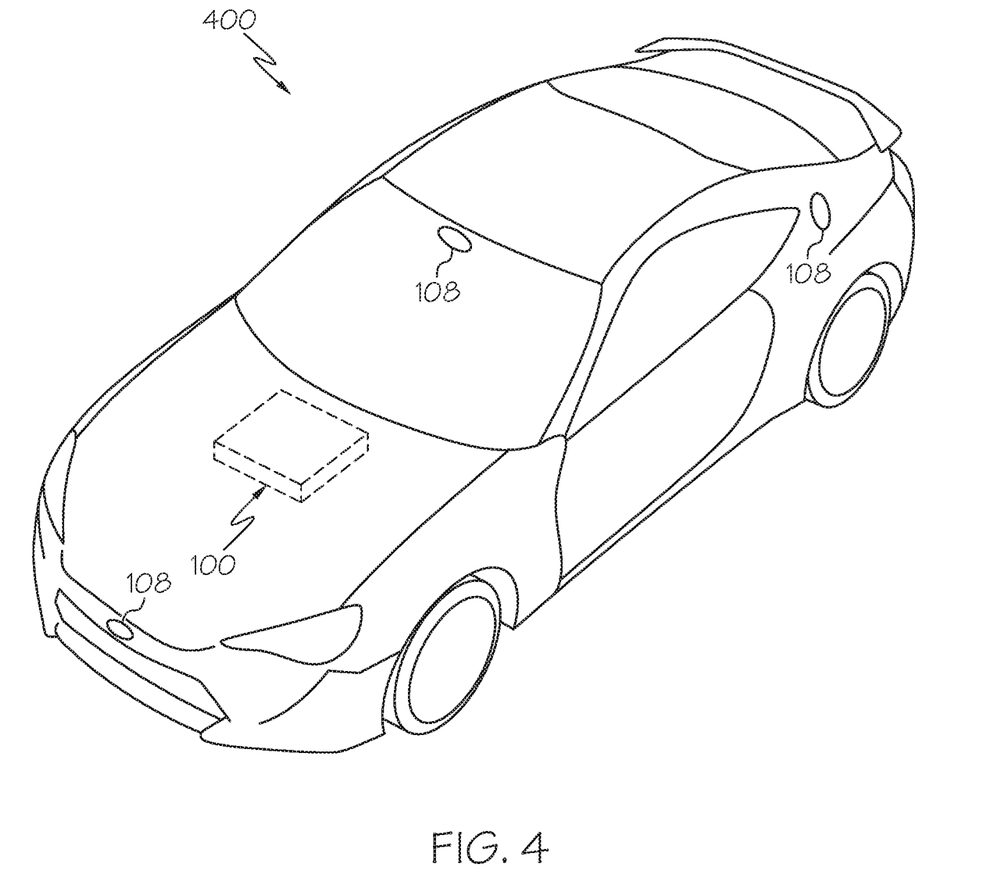
FIG. 4 schematically depicts an example vehicle including a system for determining wrong direction driving according to one or more embodiments described and illustrated herein.

The ego vehicle 210 in the examples of FIGS. 2A and 2B is equipped with the system 100 for detecting wrong direction travel described above. FIG. 4 illustrates an example vehicle 400 including the system 100 that may be used as the ego vehicle depicted in the scenarios of FIGS. 2A and 2B. The vehicle 400 has sensors 108 of the system 100 in the front of the vehicle, the sides of the vehicle, the rear of the vehicle, and the like. As stated above, the sensors 108 may include any type of sensor, such as a camera, LiDAR sensor, radar sensor, and the like. The sensors 108 produce sensor data regarding attributes of the roadway and other objects present in the environment, such as traffic lights, street lights, guard rails, traffic cones, road agents (e.g., other vehicles (cars, sport utility vehicles, trucks, semi-trucks, motorcycles, and the like) cyclists, pedestrians, and others), and the like.

Any known or yet-to-be-developed object recognition algorithms may be applied to the sensor data to recognize the attributes of the roadway and the other objects. The attributes of the roadway and other objects are detected in real-time, such as when the ego vehicle 210 travels along the roadway.

Referring again to FIG. 2A, attributes of the roadway 200 include detected shoulders S, lane dividing lines 204A, 204B, number of lanes 202A-202D, path of lanes 202A-202D (e.g., straight, curved, etc.). Particularly in areas where there are no high definition maps or other map data, the lane geometry of the roadway 200 is estimated using the detected attributes from the sensor data. In embodiments, a lane geometry estimation model having rules is used to estimate the lane geometry of the roadway 200. Any rules may be utilized, such as lanes are generally parallel to one another, a shoulder S commonly separates a roadway 200 from the surrounding area, a lane dividing line 204A, 204B separates lanes 202A-202D, a median M may separate lanes of opposite travel direction, and others. Any rules may be utilized. Detected attributes of the roadway 200 from the sensor data are provided as inputs to the lane geometry estimation model to generate a lane geometry estimation of the lane in which the ego vehicle 210 is traveling, as well as adjacent lanes, in real-time. Thus, the lane geometry of the lanes 202A-202D is estimated in real-time without the need for GPS data and/or map data. However, it should be understood that the lane estimation may be used in conjunction with GPS data and/or map data to provide a more robust understanding of the road and lane geometry.

As stated above, objects on or near the roadway 200 are also detected and can be used to estimate the lane geometry of the roadway. As guard rails (not shown) commonly demarcate the lateral boundaries of a roadway, the object recognition algorithm utilized may detect the guard rails, which is then used by the lane estimation model to establish the boundaries of the roadway 200. Other objects may also be detected and used by the lane estimation model. As another non-limiting example, road signs may also be detected and used. For example, a divided highway road sign may be detected and used by the lane estimation model to estimate the direction of travel of the various lanes 202A-202D of the roadway 200. As another example, the front-side and back-side of signs may be detected using the sensor data. A back-side of a sign may indicate a direction of travel opposite that of the ego vehicle 210. Likewise, a front-side of a sign may indicate a direction of travel parallel to that of the ego vehicle 210.

As stated above, other road agents, such as vehicles 211A-211C and their attributes are detected from the sensor data. One or more object recognition algorithms may be used to detect the presence of road agents and classify such road agents (e.g., car, truck, cyclist) and the like. Attributes of the other road agents may also be determined from the sensor data. Non-limiting road agent attributes include direction of travel, velocity, acceleration, and lane changes.

Attributes of the road agents sharing the roadway with the ego vehicle 210 may be used to determine a direction of travel of the one or more lanes using the sensor data. The lane estimation model may determine a direction of travel for a plurality of vehicles in the lanes of the roadway. Many vehicles traveling in a common direction in one lane is indicative of the intended travel direction of that lane. The lane geometry estimation model may use the common direction of travel of the plurality of vehicles to establish an intended direction of travel for the lanes of the roadway 200.

Referring to FIG. 2A, vehicle 211A in lane 202C is traveling in the first direction which is the same as the ego vehicle 210 in lane 202D. The system 100 detects the travel direction of vehicle 211A, as well as other vehicles within lane 202C. Additional vehicles traveling in lane 202C may also be detected and their direction of travel used to increase the confidence of the intended travel direction of lane 202C. Similarly, the system 100 detects the travel direction of vehicle 211B in lane 202B and vehicle 211A in lane 202C to establish the travel direction of lanes 202A and 202B.

Referring to FIG. 2B, the system 100 may use the lane geometry model to establish, based on sensor data, that there are two adjacent lanes 252A, 252B in a roadway 250 having a path that is curved. Using sensor data from the sensors 108, the system 100 operated by the ego vehicle 210 determines that the direction of travel of lane 252B is opposite that of lane 252A in which the ego vehicle 210 is traveling due to the observation of the direction of travel of vehicle 211D.

Thus, the system 100 determines and records the lane geometry and direction of travel of lanes of a roadway in real-time without the need for GPS data and/or map data. The system 100 stores the direction of travel of one or more vehicles in one or more lanes of the roadway in real-time. As stated above, other objects may be used to establish the direction of travel for the various lanes, such as road signs, for example.

Figure 2C:
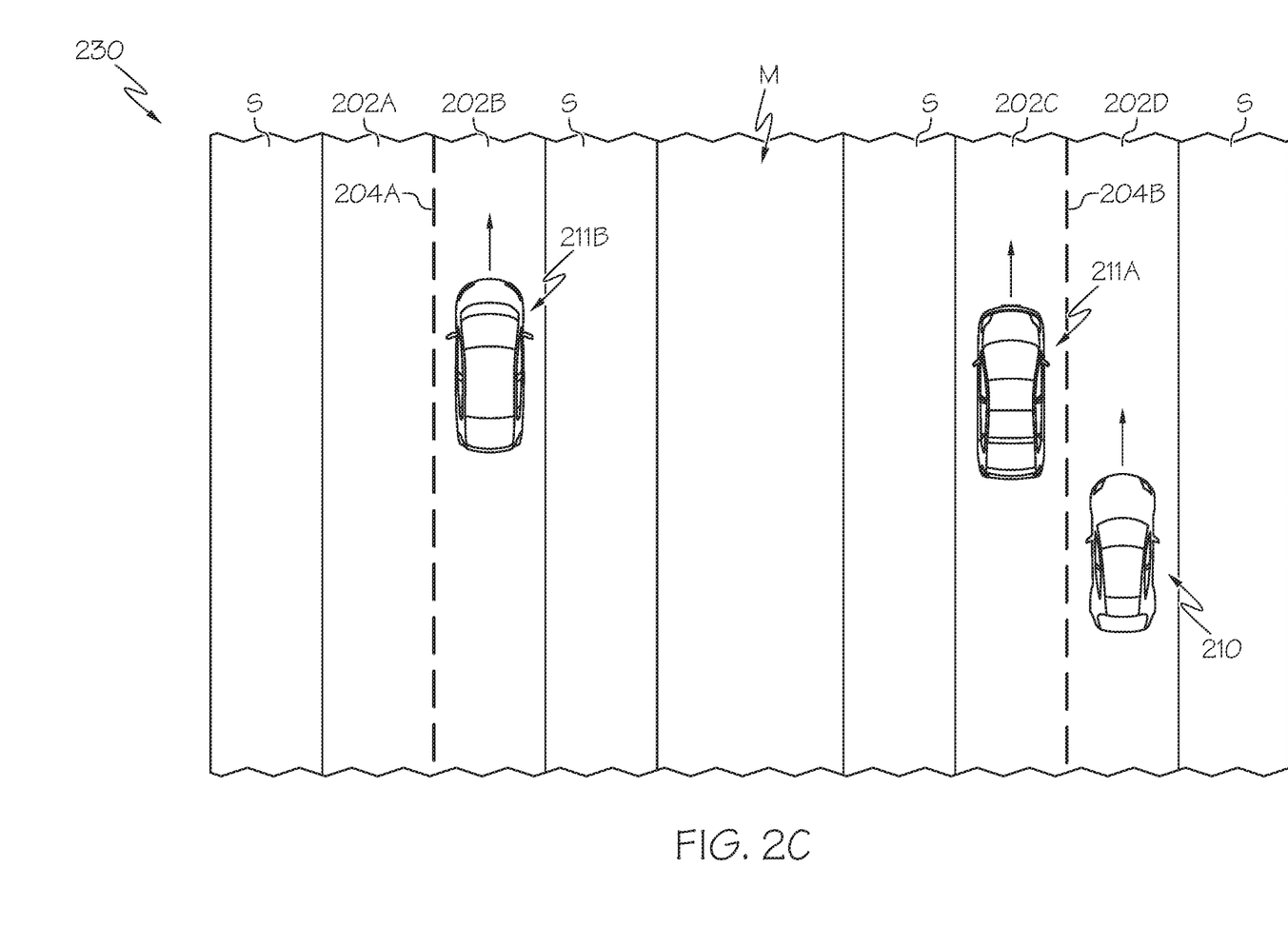
FIG. 2C schematically depicts an example divided highway and a vehicle driving in the wrong direction for detection by embodiments of the present disclosure.

The system 100 also identifies a non-compliant vehicle traveling in a direction in a lane that is different from the determined direction of travel as determined by the system 100. Referring now to FIG. 2C, a roadway similar to FIG. 2A is schematically illustrated. The direction of travel of each lane is the same as shown in FIG. 2A. Thus, a direction of travel of lanes 202A and 202B as determined by the system 100 based on observations from sensor data is the opposite of the direction of travel of lanes 202C and 202D.

As shown in FIG. 2C, non-compliant vehicle 221B is driving in a wrong direction as indicated by the arrow. The wrong direction is different from (i.e., opposite from) the determined direction of travel as determined by the system 100 (see FIG. 2A). The wrong direction driving of non-compliant vehicle 221B may cause issues for other vehicles traveling in lanes 202A and 202B.

The system 100 uses the sensor data provided by the sensors 108 to detect the direction of travel of non-compliant vehicle 221B, and determines that its direction of travel is different from the determined direction of travel. Detecting this difference in direction of travel may be done by any means. As a non-limiting example, a random sample consensus algorithm is used to detect the wrong direction of the non-compliant vehicle. The direction of travel of vehicles in each detected lane is determined and recorded using the lane geometry algorithm. Many vehicles traveling in a common direction indicate the determined direction of travel. The detected direction of travel of vehicle for each lane is provided to the random sample consensus algorithm. A non-compliant vehicle will have a direction of travel that is different from the detected direction of travel of the other vehicles in that lane, and thus may be flagged as an outlier by the random sample consensus algorithm.

Referring again to FIG. 2C, the system 100 will determine non-compliant vehicle 221B as traveling in a wrong direction. When the system 100 makes such a determination, it may take various actions. In one non-limiting example, the system 100 wirelessly transmits a wrong direction warning to interested parties. As examples and not a limitation, interested parties include the non-compliant vehicle 221B, other vehicles in proximity to the non-compliant vehicle 221B that may encounter the non-compliant vehicle 221B, and government authorities (e.g., police department or highway patrol), and the like. The wrong driving warning may cause the non-compliant vehicle 221B to change direction, may cause other vehicles to avoid the non-compliant vehicle 221B and may cause government authorities to intercept the non-compliant vehicle 221B.

The transmission of the wrong direction warning may be provided by any means. In one example, the wrong direction warning may be provided to vehicles by a vehicle-to-vehicle communication protocol. Other examples include transmission by cellular networks or satellite networks.

In some embodiments, lane geometry information, including determined directs of travel, may be stored and uploaded to a remote server for future use. Accordingly, the ego vehicle 210 may access a remote server (or data previously downloaded from a remote server) to use historical lane geometry information to determine the direction of travel of lanes in real-time. Further, in some embodiments, incidents of wrong direction travel may be stored and analyzed. The historical data may reveal that drivers frequently drive in the wrong direction in certain lanes, which may be indicative of confusing intersections, confusing entrance or exit ramps, lack of road signs, and the like. Corrective action by the relevant authority may be taken at problem areas to prevent future wrong direction driving.

Figure 3:
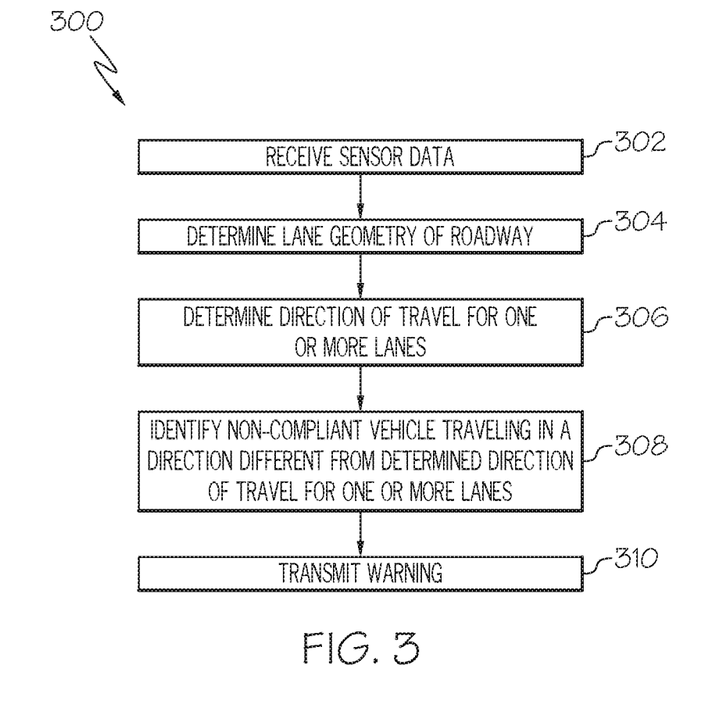
FIG. 3 graphically depicts a method for determining wrong direction driving according to one or more embodiments described and illustrated herein.

Referring now to FIG. 3, a flowchart 300 illustrating an example method of detecting wrong direction driving is provided. It should be understood that embodiments are not limited by the order and number of steps illustrated by the flowchart 300 of FIG. 3, and that more or fewer steps may be provided and/or in an order different from that shown by the flowchart 300 of FIG. 3. At block 302, one or more processors 106 of the system 100 receive sensor data from one or more sensors 108. The sensor data may be one or more of camera data, LiDAR data, radar data, proximity data, or any other sensor data providing information of the environment in which the system 100 is deployed.

At block 304, the lane geometry of a roadway in proximity to the environment in which the system 100 is deployed is estimated. In some embodiments, the lane geometry is estimated in real time using the sensor data. More particularly, in some embodiments, one or more object recognition algorithms are used to detect attributes of the roadway as well as objects on or near the roadway. Attributes include, but are not limited to, shoulders, lane dividing lines, other lane markings, medians, and the like. Objects include, but are not limited to, road agents, guard rails, signs, street lights, and the like. The lane geometry includes the location and boundary of various lanes in the roadway, as well as the path of the various lanes (straight, curved, etc.). As a non-limiting example, the attributes of the roadway and the objects are provided as inputs into a lane geometry model that applies rules to determine the geometry of lanes in the roadway.

At block 306, the direction of travel for one or more lanes of a roadway is determined. In some embodiments, the attributes of the roadway and/or the objects on or near the roadway are analyzed to determine the direction of travel for the one or more lanes. As a non-limiting example, a plurality of vehicles traveling in a common direction in a lane establishes the common direction as the determined direction of travel for the particular lane. As another example, detection of road signs and the direction they face are used to establish a direction of travel of one or more lanes.

At block 308, a non-compliant vehicle traveling in a direction opposite from a detected direction of travel is identified. For example, the non-compliant vehicle may be driving the wrong way in a lane of a roadway. Sensor data from the sensors 108 of the system 100 is used to detect the non-compliant vehicle. When the direction of travel of the vehicle is different from the detected direction of travel (e.g., opposite from), the vehicle is flagged as a non-compliant vehicle. In some embodiments, a random sample consensus algorithm is used to determine the non-compliant vehicle because its direction of travel is an outlier with respect to other vehicles traveling in the particular lane.

When a non-compliant vehicle is identified, a wrong direction warning may be transmitted at block 310. The wrong direction warning may be transmitted to relevant entities, such as the non-compliant vehicle, other vehicles in proximity to the non-compliant vehicle, government authorities, and the like. The wrong direction warning may be used to correct the direction of travel of the non-compliant vehicle.

It should now be understood that embodiments of the present disclosure are directed to vehicles, systems, and methods for detecting wrong direction driving of vehicles in real-time, with or without GPS and/or map data (e.g., high definition map data). Embodiments may detect the lane geometry of the lanes of a roadway, determine a direction of traveling of the lanes of the roadway, and identify non-compliant vehicles traveling in a direction that is different from the determined direction of travel of a particular lane. Embodiments may further transmit a wrong direction warning to relevant entities.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A system for determining a vehicle traveling in a wrong direction, the system comprising:
   one or more sensors that produce sensor data;
   one or more processors;
   a wireless communication module; and
   one or more non-transitory computer-readable medium storing computer-readable instructions that, when executed by the one or more processors, cause the one or more processors to:
      determine one or more lanes within a roadway using the sensor data; determine a direction of travel of the one or more lanes using the sensor data;
      identify a non-compliant vehicle traveling in a direction in the one or more lanes that is different from the determined direction of travel in the one or more lanes; and
      transmitting, using the wireless communication module, a wrong direction warning to at least one of the non-compliant vehicle and other vehicles in proximity to the non-compliant vehicle,
      wherein the determined direction of travel is determined by observing, using the sensor data, a plurality of vehicles traveling in a common direction in the one or more lanes of the roadway, and
      wherein the non-compliant vehicle is identified using a random sample consensus algorithm, and a direction of travel of the non-compliant vehicle is an outlier with respect to a direction of travel of the plurality of vehicles.

2. The system of claim 1, wherein the wrong direction warning is transmitted by a vehicle-to-vehicle communication protocol.

3. The system of claim 1, wherein the one or more lanes within the roadway are determined in real time using the sensor data.

4. The system of claim 3, wherein the one or more lanes within the roadway are determined by a lane geometry model.

5. The system of claim 1, wherein the one or more lanes within the roadway are determined in real time as the vehicle travels on the roadway using the sensor data.

6. A method for determining a vehicle traveling in a wrong direction, the method comprising:
   receiving sensor data from one or more sensors;
   determining, using the sensor data, one or more lanes within a roadway;
   determining, using the sensor data, a direction of travel of the one or more lanes;
   identifying, based on the sensor data and the determined direction of travel of the one or more lanes, a non-compliant vehicle traveling in a direction in the one or more lanes that is different from the determined direction of travel in the one or more lanes; and
   transmitting, using a wireless communication module, a wrong direction warning to at least one of the non-compliant vehicle and other vehicles in proximity to the non-compliant vehicle,
   wherein the determined direction of travel is determined by observing, using the sensor data, a plurality of vehicles traveling in a common direction in the one or more lanes of the roadway, and
   wherein: the non-compliant vehicle is identified using a random sample consensus algorithm; and a direction of travel of the non-compliant vehicle is an outlier with respect to a direction of travel of the plurality of vehicles.

7. The method of claim 6, wherein the wrong direction warning is transmitted by a vehicle-to-vehicle communication protocol.

8. The method of claim 6, wherein the one or more lanes within the roadway are determined in real time using the sensor data.

9. The method of claim 8, wherein the one or more lanes within the roadway are determined by a lane geometry model.

10. A vehicle comprising:
    one or more sensors that produce sensor data; one or more processors;
    a wireless communication module; and
    one or more non-transitory computer-readable medium storing computer-readable instructions that, when executed by the one or more processors, cause the one or more processors to:
       determine one or more lanes within a roadway using the sensor data;
       determine a direction of travel of the one or more lanes using the sensor data;
       identify a non-compliant vehicle traveling in a direction in the one or more lanes that is different from the determined direction of travel in the one or more lanes; and
       transmit, using the wireless communication module, a wrong direction warning to at least one of the non-compliant vehicle and other vehicles in proximity to the non-compliant vehicle, wherein the determined direction of travel is determined by observing, using the sensor data, a plurality of vehicles traveling in a common direction in the one or more lanes of the roadway, and wherein: the non-compliant vehicle is identified using a random sample consensus algorithm; and a direction of travel of the non-compliant vehicle is an outlier with respect to a direction of travel of the plurality of vehicles.

11. The vehicle of claim 10, wherein the wrong direction warning is transmitted by a vehicle-to-vehicle communication protocol.

\* \* \* \* \*